Sept. 3, 1968  J. D. TINER ET AL  3,399,653
METHOD AND APPARATUS FOR THE COLLECTION AND
STORAGE OF PARASITIC LIFE
Filed May 6, 1965  2 Sheets—Sheet 1
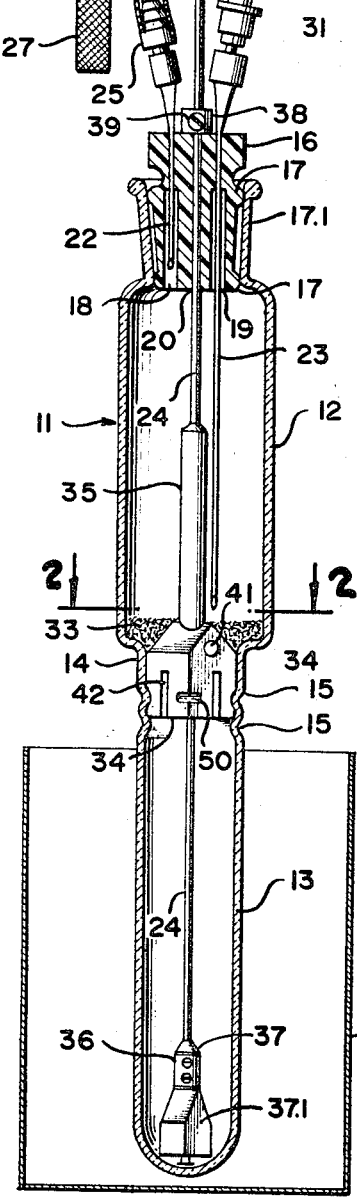
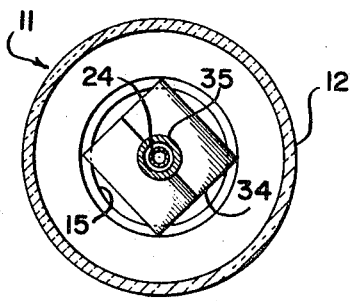
INVENTORS
JACK D. TINER
& JACOB SMIT
By Hurwitz & Rose
ATTORNEYS

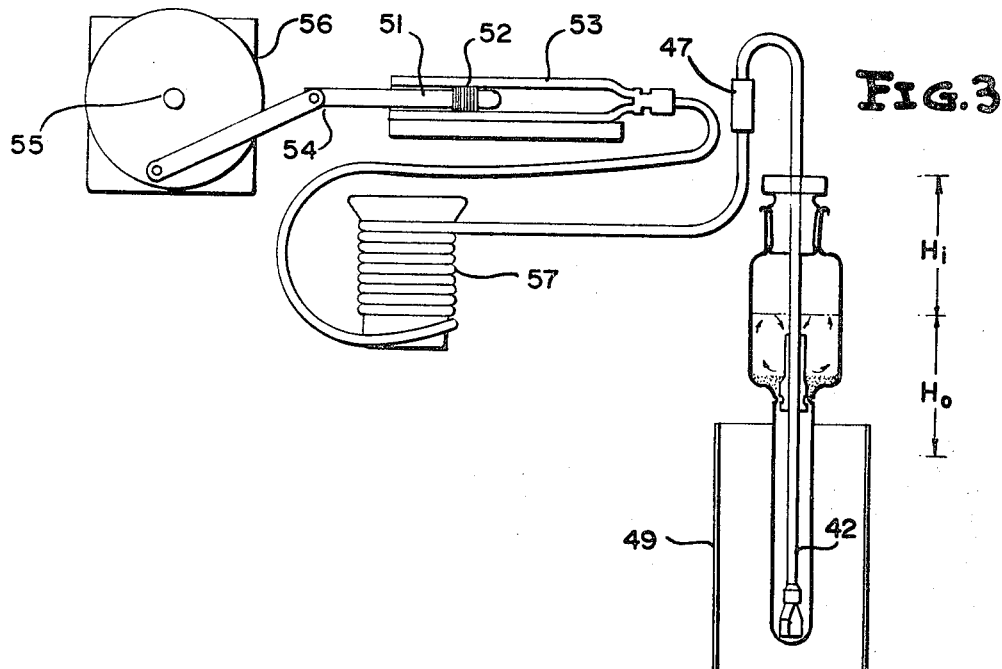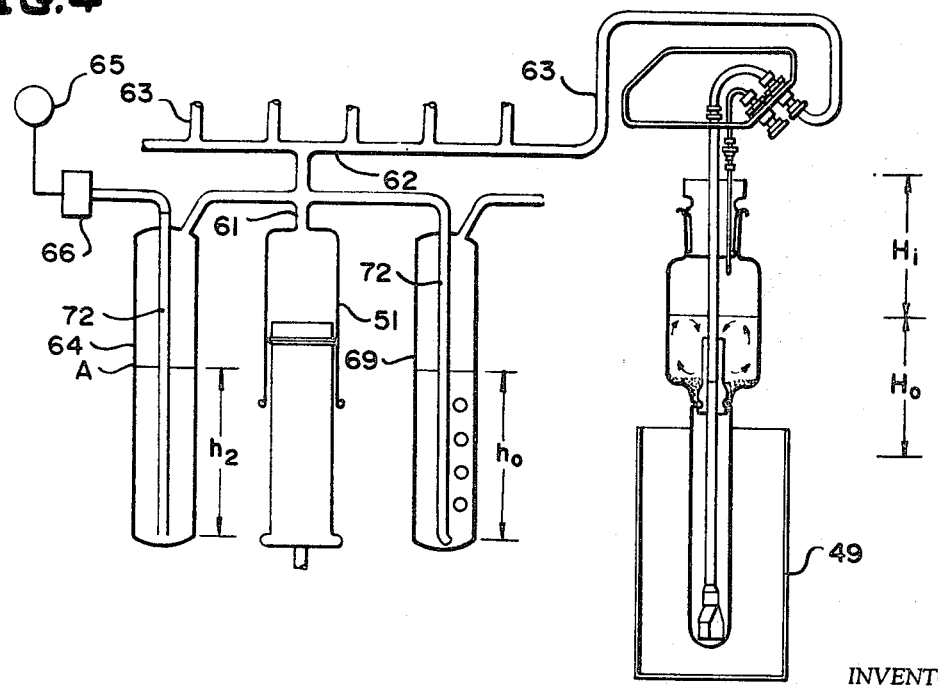

United States Patent Office
3,399,653
Patented Sept. 3, 1968

3,399,653
METHOD AND APPARATUS FOR THE COLLECTION AND STORAGE OF PARASITIC LIFE
Jack D. Tiner, Washington, D.C., and Jacob Smit, Manassas, Va., assignors to Melpar, Inc., Falls Church, Va., a corporation of Delaware
Filed May 6, 1965, Ser. No. 453,788
16 Claims. (Cl. 119—1)

The present invention relates generally to apparatus for and methods of growing and storing parasitic life and more particularly to a storage device having a spacer located in the neck of a single container and to a method wherein a solution of a nutrient and the parasitic life is aerated periodically at a rate on the order of once a minute.

Presently, tests conducted on living matter in attempting to cure diseases resulting from infectious nematodes have frequently produced inaccurate results. Such results may occur because non-parasitic nematodes are used as test organisms. If infected host plants or animals are used, they often are not infested with the species of parasitic nematodes which are of the most general interest. Even when the source is a culture infecting laboratory grown tissue, there are two problems in obtaining parasitic nematodes in sufficient quantities to be useful as inoculum for initiation of experiments:

(1) collecting them originally, and
(2) after collection, preservation in a viable state.

Because of the growing interest in laboratory culture of nematodes and other liquid-phase dwelling invertebrates, there is presently a need for a commercially available harvesting and preserving device that will permit exclusion of contaminants during collection. The device should be easily handled, simple to utilize and inexpensive.

The present invention provides a nematode collection and storage device that meets the aforementioned requirements. The device is a single container of unitary construction having an upper segment in which plant materials infected with the nematodes are placed. The upper portion of the container communicates with the cooled lower portion through a neck in which a spacer is held by friction. The spacer has sloping top surfaces so that nematodes released from the infected plant material into a nutrient, that fills the chamber, can slide off the spacer by gravity and sink into the lower segment of the chamber. There they are preserved and stored because of the low temperature conditions and the absence of microbial contaminants which, if present, would accelerate development of anoxia in the liquid medium.

A feature of the invention is that all of the considerable apparatus for injecting nutrient, aspirating the solution, and venting the interior of the unit to the atmosphere is carried on a bracket that is rigidly connected with the container via a fixedly mounted cannula. Thereby, the entire structure is virtually self-supporting and can be used by a technician without the need to make special mounts and adjustments.

An important aspect of the invention resides in constantly aerating the nematodes-nutrient culture solution at a rate that prevents development of anoxia in the solution. We have found that cyclic aeration at a rate of approximately once per minute improves survival of the collected nematodes, and yet does not have an adverse effect on the collected nematodes or on the culture of nematodes and plant materials from which they are emerging. By inserting a tube from the top to the bottom of the chamber and changing the level of the culture in the tube from between the top and bottom of the chamber at a rate on the order of one cycle per minute, the required aeration occurs in response to:

(1) Convection currents in the culture chamber resulting from transfer within the central cannula tube of cold liquid from the bottom to the top of the chamber;
(2) Air from the atmosphere inside the central cannula tube being trapped and collected in the gas permeable plastic (Teflon) walls of the tube when the liquid level falls and then being liberated into the solution when it rises inside the tube;
(3) Drops of the liquid culture remaining on the walls of the tube when the liquid level drops, whereby the considerable surface area of the drops is aerated by air in the tube; and
(4) The meniscus of the oscillating column of solution being in contact with air in the tube, a factor that is enhanced by the meniscus constantly being changed due to turbulence of the liquid column in response to its constant vertical oscillations.

It is, accordingly, an object of the present invention to provide a new and improved apparatus and method for harvesting and storing parasitic life, such as nematodes.

Another object of the present invention is to provide a commercially acceptable device for harvesting and storing parasitic life, which device is easy to use, as well as to handle, is inexpensive, and is sterile (i.e. preserves the axenicity of the collected inoculum) when in use.

A further object of the invention is to provide a new and improved method of and apparatus for aerating parasitic life in a device that collects and stores said life.

A further object of the invention is to provide a method of an apparatus for continuously aerating parasitic life while collecting and storing said life without having an adverse effect thereon.

A further object of the invention is to provide a method of and apparatus for continuously aerating parasitic life by providing convection currents and air contact with the life in response to oscillation of a column of liquid above said life.

The above and still further objects, features and advantages of the present invention will become apparent upon consideration of the following detailed description of one specific embodiment thereof, especially when taken in conjunction with the accompanying drawings, wherein:

FIGURE 1 is a side sectional view of the storage trap of the present invention according to a preferred embodiment;

FIGURE 2 is a view looking down on the spacer of FIGURE 1, taken through the lines 2—2 of FIGURE 1;

FIGURE 3 is an illustration of one embodiment of a system for aerating the trap of FIGURE 1; and FIGURE 4 is a modification of the system of FIGURE 3 wherein plural traps are simultaneously aerated.

Reference is now made particularly to FIGURE 1 wherein there is illustrated a preferred embodiment of the harvesting unit and storage trap for cultures of plant parasitic nematodes, such as species of the genus Pratylenchus, according to the present invention. The assembly comprises a borosilicate glass tube 11 with an upper segment 12 that communicates with smaller diameter, lower segment 13 via neck 14, that has circumferentially extending retaining ripples or crimps 15 therein.

Disposed in the aperture at the upper end of the tube 11 is Teflon stopper 16, having radially extending flanges 17 that engage the tapered, ground-glass joint 17.1 to permit relative expansion of the stopper and tube 11. Stopper 16 includes three longitudinally extending bores 18–20 through which respectively extend hypodermic needles 22, 23 and stainless steel, central cannula 24.

Needle 22, which vents the interior of tube 11 to the atmosphere in combination with adapter 25, Teflon tube 26, having a U-bend therein, and cotton filter 27, extends through stopper 16 almost to its lower surface. To prevent constrictions of tube 26 at its bent segments, a piece of electrically insulating spaghetti 28 is inserted before it is bent in situ. Needle 23, employed for introducing a nutrient into the container via Teflon tubing 29, syringe adapter 31 and plug unit 32, extends almost the full length of upper container segment 12 virtually to a body of absorbent cotton 33 that is positioned just above neck 14 of the container.

In neck 14 of container 11 there is held by the friction of crimps 15, house-shaped spacer 34 having a square cross section, as illustrated by FIGURE 2. A mass of cotton 33 lies on the sloping surfaces of spacer 34 that includes a longitudinal bore for holding in place protective, plastic (Teflon) sleeve 35.1 that surrounds cannula 24 and extends approximately half way up the length of upper segment 12. Cannula 24 is of sufficient length to reach nearly to the bottom of tube 11, where it is connected to house-shaped plastic (Teflon) spacer 37.1 via sleeve coupling 36. A conical washer 37 at the top of this coupling assures that nothing will lodge on it.

Spacer 37.1 centers the end of cannula 24 just above the bottom of tube 11. This spacer is also necessary for bearing most of the weight of the central assembly. Without the support that it provides, stopper 16 may become stuck in ground glass joint 17.1.

The portion of cannula 24 force-fitted into stopper 16 at the level where it emanates from the upper surface of stopper 16 is maintained rigidly in situ by collar 38 and set screw 39. A similar result is attained by set screw coupling 36 that rests on the edge at the top of spacer 37.1. To enable spacer 34 to be easily inserted in neck 14, the spacer includes a plurality of longitudinal slots 42 that form flexible legs.

Extending from the upper end of cannula 24 is Teflon tube 42 that extends along the complete length of the cannula to form an aspirator tube. Cannula 24 and tube 42 are maintained in place by tubing adapter 43 which includes sleeve 44, having an exterior threaded surface engaged by nut 45. Stainless steel bracket 46, having the shape of an irregular hexagon with two pairs of parallel sides, carries tubing adapter 43, tubing 26 and female syringe adapters 32 and 47, preferably of the interchangeable Luer-Lok type. These are protected from contaminants and evaporation by plugs 32.1 and 47.1.

Each of adapters 32, 43, 47 and tubing 26 extends through separate apertures in the walls of bracket 46, with the adapters held in situ by threaded sleeves 44 engaging nuts 45. An alternative and superior method for holding these adapters involves use of silver solder to join them to the adapter bracket, instead of the thread and nut arrangement of FIGURE 2. At the ends of adapters 32 and 47, conections with tubing 29 and 42 can be made by removing adapter plugs 47 and attaching male adapters of tubes for aspiration, supplying nutrient, etc. By employing the rigid cannula for carrying fixedly mounting bracket 46 with the main portion of the structure, i.e. container 11, the entire unit is easily handled and is virtually self-supported.

In use, with stopper 16 removed, spacer 34 in situ, and cannula 24 raised upwardly from the position illustrated appropriate infected plant life, e.g. up to 40 sterile excised corn roots that are infected with parasitic nematodes, are aseptically placed in upper tube segment 12 on top of cotton body 33. Thereafter, stopper 16 is inserted in the aperture at the top of chamber 11, cannula 24 is pushed downwardly to the position illustrated. A sterile liquid nutrient which promotes rapid nematode growth is thereafter pumped into chambers 13 and 11 via adapter 47, tube 42 and the bottom end of spacers 37.1 and 35 so it floods the entire unit to the upper end of Teflon sleeve 35. To prevent sticking of stopper 16, as well as growth and entry of airborne microbial contaminants at the ground glass joint, precautions are taken not to wet the stopper. Before or just after the unit is flooded, lower segment 13 of container 11 is submerged into cold water bath 49, maintained between 1° and 5° C., which prevents spoilage of the collected nematodes. The upper half of container 11 is maintained at room temperature, on the order of 25° C. to permit the nematodes to continue feeding on the sterile excised roots and to multiply.

Nematodes in the infected plant life leave it when they have caused external lesions that are maniefsted by brown discolorations. After nematodes emerge into the solution, they pass by gravity through cotton filter 33 that retains bits of plant debris. Nematodes passing through filter 33 may fall onto the sloping surface of spacer 34 or on the shoulder in the glass tube. In either case, they slide into the free space along the vertical walls of the spacer. Upon reaching this space, the nematodes fall between the spacer and cylindrical container neck 14 and sink to the bottom of lower container segment 13, where their spoilage is prevented by cold bath 49. After sufficient numbers of nematodes have been accumulated at the bottom of container 11, generally once or twice weekly, they are pumped out through tubing 42 with a syringe that is connected to the plug 44, which is a part of syringe adapter 47.

After a day or so of operation from the time when the infected plants were first put into container 11, the infected tissues are aerated by aseptically pumping the solution from the container by connecting a syringe to adapter 32. After five days, the withdrawn solution is replaced by pumping fresh nutrient into chamber 11, this time via adapter 47, whereby the nematodes continue to multiply and be collected without the formation of anaerobiosis that can prevent them from reaching the bottom of chamber 11 and being collected. Also, the fresh nutrient provides glucose as well as inorganic nutrients and dilutes waste products, all of which are favorable to an increased yield of nematodes. As described infra, the present invention envisages periodic aeration of the solution, at rates on the order of one cycle per minute, while nematodes are being constantly collected and kept in storage instead of daily to weekly withdrawal through adapter 47.

Additional nutrient for the plant material and the nematodes is introduced through hypodermic needle 23 rather than central tubing 42 after the unit has been filled for the first time because re-use of tubing 42 for this purpose may result in the formation of bubbles at the collection point. These rise to form an air lock under spacer 34 and at the collection point to impede downward migration and sinking of the nematode yield. Such an air lock overcomes the advantage of periodically inserting sterile nutrient.

As disclosed in FIGURE 3, aeration of a single nematode trap while the collection process occurs at the bottom of chamber 11 is effected at a rate on the order of one cycle per minute (approximately 10,000 cycles per week) by connecting central Teflon tube 42 to pump 51. Pump 51 includes piston 52 that is driven in cylinder 53 through simple harmonic motion by crank 54. Piston 52 is driven via linkage 54 by crank 55 that is eccentrically rotated by motor 56 at the rate of one revolution per minute. Tubing 42, between adapter 47 and pump 51, is wound as baffle coil 57 that traps airborne contaminants, e.g., mold spores, in the tubing and prevents them from entering the sterile nutrient solution via cannula 42.

When piston 52 is driven to the right side of cylinder 53 so tube 42 is under maximum pressure, the meniscus level of the nematode-nutrient solution is driven almost, but not quite, to the bottom of the tube. As piston 52 is withdrawn from cylinder 53, the pressure within tube 42 decreases and the meniscus level of the solution rises into the curved zone of the tube, almost to coupling 44. As the meniscus level rises, the cold nematode solution causes local cooling at the interior of chamber where the infected roots are located. Cooling at the center upper portion of chamber 11 results in formation of convection currents in the nutrient to prevent stagnation (anaerobiosis) thereof, whereby the nutrient is freely circulated through the infected tissue.

The meniscus level period of oscillation is selected to be on the order of one cycle per minute because this slow rate has no adverse disturbing effects on the mass of collected nematodes at the bottom of chamber 11. In addition, the nematodes in tube 42 are not overheated when the meniscus level rises above cold bath 49. The 30-second maximum period that the nutrient in the cannula is withdrawn from cold bath 49, is insufficient to warm it enough that it will have any serious detrimental effects on the lives of the nematodes. Thus, the specified rate provides sufficient aeration of the cultured tissue to maintain it healthy.

The changing meniscus level causes aeration by three additional mechanisms in addition to the convection current cooling phenomena previously mentioned. The first additional aeration mechanism occurs as a result of the solution being exposed to the walls of Teflon tube 42 as the solution is pumped up and down. When the solution is driven below the level of bath 49, the interior wall of tube 42, in the region where the infected roots are located, is exposed to room or ambient air that leaks in through the seal between piston 52 and cylinder 53. Since Teflon is gas permeable, a portion of this air is stored in tube 42 and thereafter escapes into the culture when the meniscus level is raised. Carbon dioxide produced by the nematodes can diffuse from the vicinity of the stored inoculum mass into the oscillating air in tube 42, and escape into the atmosphere because of imperfections in piston 52 and the previously mentioned gas permeability of the plastic from which it is made.

Aeration is also accomplished because small droplets of the nematode solution remain on the interior walls of tube 42. These droplets, being in direct contact with air in tube 42, have their relatively substantial surfaces aerated. When the meniscus level rises again these aerated droplets again become a part of the total culture mass.

The third aeration effect comes about because the meniscus itself is always in contact with air in tube 42. As the meniscus level changes, turbulence occurs in the liquid to cause circulation and additional exposure of more of the culture medium to the top of the oscillating column.

*Experimental results*

The pumped unit has been tested in the laboratory and found to permit prolonged storage of nematode inoculum in a motile and therefore, apparently viable state. In one test set up, seven trap units were charged with sterile roots according to the method described by Tiner (Tiner, J. D., 1961. Cultures of the Plant-Parasitic Nematode Genus Pratylenchus on Sterile Excised Roots. (II) A Trap for Collection of Axenic Nematodes and Quantitative Initiation of Experiments. Experimental Parasitology, 11:231–240). The roots were transferred from agar plates to the 7 units in the dust-free atmosphere of a glove box. These units were used to test the effect of pumping in the central cannula and also storage in the cold (1 to 2 C.) on survival of trapped nematode inoculum. Therefore, two units were placed upright in holes in a wooden block in the glove box, and five were inserted into the cold water bath as shown in FIG. 1. All seven units were flooded with sterile nutrient medium. One unit was hooked to the air pump so that the medium in the central cannula oscillated up and down at a rate of 1 cycle per second. After one week, the medium was aspirated from six of the culture chambers (#12, FIG. 1) so that its surface only touched the lower end of the root mass. The culture chamber of the seventh unit (the pumped one) was left filled to the top of spacer sleeve 35. During the next few days, the drained roots in one of the refrigerated units developed a mold growth. In order to avoid possible introduction of contaminants into the other units, all were left unchanged for the remainder of the experiment. Thus, the pumped unit was dependent on convection as discussed and any gentle stirring action as the liquid level fluctuated up and down almost imperceptibly during each pump cycle over the next 121 days.

At the conclusion of that period, the nematode yield was drawn out of each unit by quickly pulling about 5 ml. of medium into a sterile 10 ml. syringe attached to adapter 47. Each syringe contained 1 to 3 ml. of air in addition to the nematode suspension. Therefore, as it was rocked back and forth gently the nematodes were aerated. After a few hours, the rocking was repeated, and the nematodes were examined for motility under the binocular stereoscopic microscope. Only in the suspension harvested from the pumped unit were more than half of the nematodes motile. None of those in the mold-contaminated unit appeared to be alive. Four units were selected for a test of viability of the nematode yield. One at a time the syringes were emptied into clean sterile separatory funnels. These were attached to an air line as previously described, and stirred by a stream of rising bubbles. Nematode counts were made on .05 ml. of the suspension, and numbers dead and alive were counted. Results are tabulated below:

| Unit | Pumped | Temperature (C.) | Total yield (number of nematodes) | Percent harvested | Percent motile | Percent apparent efficiency |
| --- | --- | --- | --- | --- | --- | --- |
| O | No | Room | 31,600 | 62 | 19 | 12 |
| N+ | Yes | 1.5–2 | 85,400 | 76 | 90 | 68 |
| N− | No | 1.5–2 | 46,100 | 62 | 53 | 33 |
| A | No | 1.5–2 | 32,900 | 64 | 59 | 38 |

Percentage harvest was determined by grinding the roots in a Waring Blendor and counting numbers per sample volume.volume. The apparent efficiency was obtained by multiplying the percent harvested by the percent motile. A more significant figure would result from using the percent viable instead of the percent motile. However, there is no accurate, quantitative method to measure viability. Even so, the pumped unit gave the largest yield, the most efficient harvest, and the greatest percentage of motile nematodes.

By utilizing the structure illustrated in FIGURE 5, multiple chambers can be simultaneously aerated. This is accomplished by connecting output conduit 61 of one cycle per minute pump 51 to manifold 62, having multiple ports 63 to each of which is connected the Teflon tube 42 of a different culture chamber. Conduit 61 of pump 51 is connected via inlet valve 64 to source 65 of sterile compressed air that passes through millipore filter 66. Conduit is also connected to output valve 69, having an orifice 71 that is vented to the atmosphere. Each of valves 64 and 69 includes a liquid, into which is submerged inlet standpipes 72. Outlet orifices 71 and 71.1 are at the top of valves 64 and 69, always above the liquid level. The construction employed enables sufficient air to be bubbled through the liquid of valves 64 and 69 to provide the desired degree of aeration for a great many simultaneously operating culture chambers.

While we have described and illustrated one specific embodiment of our invention, it will be clear that variations of the details of construction which are specifically illustrated and described may be resorted to without departing from the true spirit and scope of the invention.

We claim:
1. Apparatus for storing and collecting parasites in a viable state, said parasites deriving from infected plant life in response to contact between the plant and a fluid nutrient for the parasites comprising an elongated unitary container for confining said nutrient and having an upper portion for holding said plant life and an aperture at its top for admitting said life into the container, a lower portion and a neck between said portions, a spacer held in situ in said neck, said spacer having sloping upper surfaces terminating downwardly at points spaced from the wall of said container so that parasites, deriving from said life, in said nutrient fall to the bottom of said container, and a conduit passing substantially from the bottom of said container through said aperture for withdrawing from the chamber nematodes collected at the bottom of the chamber.

2. The apparatus of claim 1 further including an aerating pump connected to the end of said conduit outside of said container.

3. The apparatus of claim 1 further including a pump having a period on the order of one cycle per minute connected to the end of said conduit outside of said container.

4. Apparatus for storing and collecting parasites in a viable state, said parasites deriving from infected plant life in response to contact between the plant and a fluid nutrient for the parasites comprising an elongated unitary container for confining said nutrient and having an upper portion for holding said plant life and an aperture at its top for admitting said life into the container, a lower portion and a neck between said portions, a spacer held in situ in said neck, said spacer having sloping upper surfaces terminating downwardly at points spaced from the wall of said container so that parasites, deriving from said life, in said nutrient fall to the bottom of said container, a stopper in said aperture, a conduit having rigid outer walls extending substantially from the bottom of said container through said spacer and said stopper, means for maintaining said rigid walls in fixed longitudinal relationship with said stopper and said container, a bracket for carrying appliances for venting said container and feeding nutrient into it, and means for mounting said bracket on the end of said conduit protruding from said stopper, said mounting means being the only support for said bracket.

5. The apparatus of claim 4 wherein said stopper is provided with an aperture into which a venting means for said container is inserted, said venting means extending upwardly and being carried by said bracket.

6. The apparatus of claim 4 wherein said stopper is provided with an aperture through which a needle extends into said container proximate with said spacer, conduit means connecting said needle to said bracket, said last-named conduit means being provided for feeding nutrient into said chamber.

7. The apparatus of claim 4 wherein said stopper is provided with first and second longitudinal apertures, a venting means for said container being inserted into one of said apertures extending upwardly and being carried by said bracket, a needle extending through the other of said apertures into said container proximate with said spacer, and conduit means connecting said needle to said bracket, said last-named conduit means being provided for feeding nutrient into said chamber.

8. The apparatus of claim 7 further including an air purifying filter in said venting means and a filter for collecting debris from said plant life positioned on said spacer.

9. Apparatus for storing and collecting parasites in a viable state, said parasites deriving from infected plant life in response to contact between the plant and a fluid nutrient for the parasites comprising an elongated container for confining said nutrient and having: an upper portion for holding said plant life and an aperture at its top for admitting said life into the container, a lower portion communicating with said upper portion, a neck between said portions; means held in situ in said neck for enabling parasites, deriving from said life in said nutrient, to fall by gravity to the bottom of said container, a conduit passing substantially from the bottom of said container through said aperture for withdrawing from the chamber nematodes collected at the bottom of the chamber, and pump having a stroke period on the order of once per minute connected to the end of said conduit opposite from the end at the bottom of said container.

10. The apparatus of claim 9 wherein a plurality of said containers is provided, and means connecting said pump to a conduit included with each of said containers.

11. A method for improving the collection of parasitic life in liquid solution deposited by gravity in the bottom portion of a container from infected plant life located in an upper portion of the container, said container being flooded with nutrient for said life, comprising aerating said solution by raising and lowering a portion thereof inside a tube from the bottom to the upper portion of the container, at a cyclic rate on the order of once a minute.

12. A method for improving the collection of parasitic life in liquid solution deposited by gravity in the bottom portion of a container from infected plant life located in an upper portion of the container, said container being flooded with nutrient for said life, comprising aerating said solution by continuously raising and lowering a portion thereof inside a tube from the bottom to the upper portion of the container, at a cyclic rate on the order of once a minute.

13. The method of claim 12 wherein the bottom portion of the chamber is maintained at a sufficiently low temperature to preserve the culture deposited therein and the upper portion of the container is maintained at a sufficiently high temperature to promote migration of said life from said plant to the nutrient.

14. The method of claim 13 wherein said low temperature is between 1°–5° C. and said high temperature is approximately room temperature.

15. A method for storing parasitic life stored in liquid solution in the bottom portion of a container, said container being flooded with nutrient for said life, comprising aerating said solution by raising and lowering at a cyclic rate on the order of once per minute a portion thereof in a tube extending through said chamber, said portion being raised to a level above the level of said solution.

16. A method for storing parasitic life stored in liquid solution in the bottom portion of a container, said container being flooded with nutrient for said life, comprising aerating said solution by raising and lowering at a cyclic rate on the order of once per minute a portion thereof, said portion being raised to a level above the level of said solution.

References Cited

UNITED STATES PATENTS

| | | | |
|---|---|---|---|
| 2,990,808 | 7/1961 | Rumonski | 119—1 |
| 3,115,864 | 12/1963 | Wagner | 119—1 |
| 3,116,712 | 1/1964 | Ogden et al. | 119—3 |
| 3,129,692 | 4/1964 | Sanderson | 119—15 |
| 3,140,007 | 7/1964 | Nettleship | 220—97 |
| 3,166,043 | 1/1965 | Castillo | 119—3 |
| 3,198,171 | 8/1965 | Westphal | 119—1 |
| 3,216,395 | 11/1965 | Girard | 119—5 |
| 3,238,922 | 3/1966 | Trexler | 119—15 |
| 3,283,743 | 11/1966 | Dibelius | 119—1 |

ALDRICH F. MEDBERY, *Primary Examiner.*